United States Patent [19]

Barnett

[11] Patent Number: 5,236,398

[45] Date of Patent: Aug. 17, 1993

[54] WHEELCHAIR DRIVE APPARATUS

[75] Inventor: Franklin E. Barnett, 2054 So. Iola Ct., Aurora, Colo. 80014

[73] Assignees: Franklin E. Barnett, Aurora; Brian D. Smith, Highlands Ranch, both of Colo.

[21] Appl. No.: 924,181

[22] Filed: Aug. 3, 1992

[51] Int. Cl.$^5$ .............................................. F16H 7/00
[52] U.S. Cl. ................................... 474/149; 474/150; 297/DIG. 4; 280/246; 280/250.1; 280/255; 280/258
[58] Field of Search .................... 474/148–150; 280/200, 225, 242.1, 248–250, 250.1, 252, 253, 261, 304.1, 246, 255, 258; 297/DIG. 4

[56] References Cited

U.S. PATENT DOCUMENTS

| 494,839 | 4/1893 | Berry . | |
|---|---|---|---|
| 1,273,693 | 7/1918 | Tucker . | |
| 3,191,953 | 6/1965 | Aysta | 280/250.1 X |
| 3,309,110 | 3/1967 | Bulmer | 280/242 |
| 3,629,880 | 12/1971 | Van Rhyn | 280/250 X |
| 3,666,292 | 5/1972 | Bartos | 280/234 |
| 3,877,725 | 4/1975 | Barroza | 280/242 WC |
| 3,937,519 | 2/1976 | Schoolden | 280/250.1 X |
| 3,994,509 | 11/1976 | Schaeffer | 280/242 WC |
| 4,044,850 | 8/1977 | Winsor | 280/250.1 X |
| 4,063,747 | 12/1977 | Young | 280/255 |
| 4,274,651 | 6/1981 | Dumont | 280/242 WC |
| 4,453,729 | 6/1984 | Lucken | 280/242 WC |
| 4,652,026 | 3/1987 | Byrge | 280/242 WC |
| 4,762,332 | 8/1988 | Seol | 280/242 WC |
| 4,811,964 | 3/1989 | Horn | 280/255 X |
| 4,865,344 | 9/1989 | Romero, Sr. et al. | 280/242 |
| 4,928,986 | 5/1990 | Carpenter | 280/234 |

Primary Examiner—Terry Lee Melius
Assistant Examiner—Roger J. Schoeppel
Attorney, Agent, or Firm—Fields, Lewis, Pittenger & Rost

[57] ABSTRACT

A drive apparatus and method for continuously transmitting power to an axle to rotatingly drive the axle are disclosed. The drive apparatus includes a flexible ratch such as a flexible chain, belt, or cable, and cooperating first and second ratch engaging members for alternatively engaging the flexible ratch to continuously drive an axle. To operate the apparatus, one moves the first and second ratch engaging members in a first direction which causes the first ratch engaging member to engage and drive the flexible ratch which rotatingly drives the axle. One then reverses the ratch engaging members' direction of movement which causes the simultaneous releasing and engaging of the ratch by the first and second ratch engaging members, respectively, which continuously drives the axle.

10 Claims, 3 Drawing Sheets

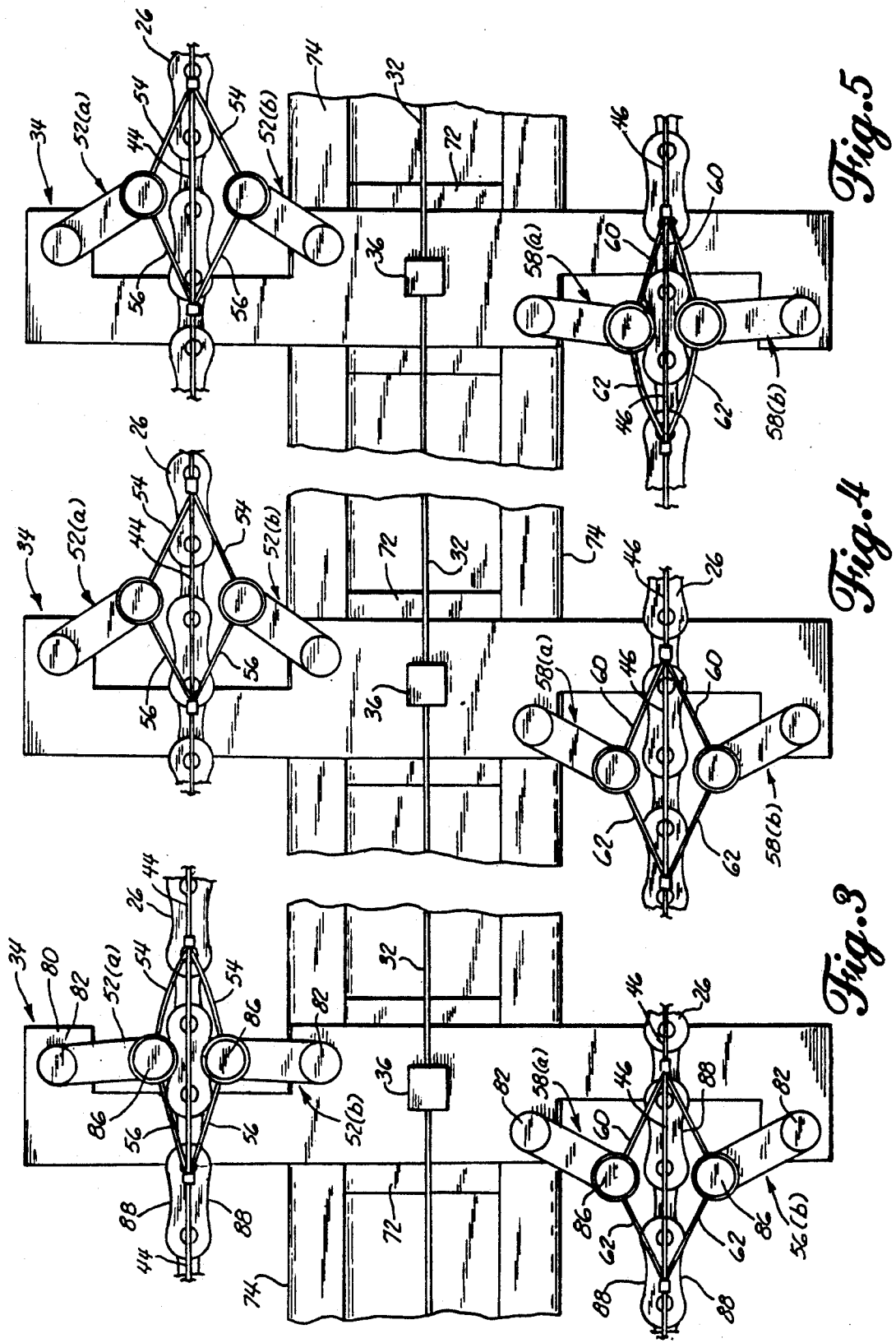

1

WHEELCHAIR DRIVE APPARATUS

TECHNICAL FIELD

The invention relates generally to method and apparatus for driving axles driven by chains, belts, cables and the like and, more specifically, to a method and apparatus for driving bicycles and wheelchairs.

BACKGROUND OF THE INVENTION

The prior art is replete with apparatus for driving wheel chairs and bicycles. Examples of such apparatus found in a search of prior art for such apparatus are disclosed in U.S. Pat. Nos. 4,865,344; 4,762,332; 4,652,026; 4,453,729; 4,274,651; 4,063,747; 3,994,509; 3,877,725; 3,666,292; 3,309,110; 1,273,693 and 494,839.

A review of the above patents reveals that none of the apparatus disclosed therein is capable of receiving or transmitting linearly generated power, i.e. power which is generated by power strokes traveling along a straight line or path. All apparatus disclosed in the patents require that the operator move a handle or pedal through some sort of an arcuate or curved path in order to make a power stroke with a device. For example, in U.S. Pat. No. 3,877,725 to Barroza, it can be seen in FIG. 4 that the wheelchair is driven by moving handle 3 through the arcuate path illustrated by the arrows in FIG. 4. Similarly, in U.S. Pat. No. 4,063,747 to Young, it can be seen in FIG. 1 that the bicycle disclosed therein is powered by moving pedals 36 through an arcuate path. It will also be appreciated that the pedal of a conventional bicycle also follows an arcuate path as it revolves about the axis of the bicycle's main sprocket.

One problem with generating power along a curved or arcuate path is that the portion of the path over which maximum power can be generated is very short. For example, in a conventional bicycle, maximum power is generated during that portion of the pedal's path which travels from about +45° from the horizontal to about −30° from the horizontal. As can be visualized, it is difficult to generate significant power outside this portion of the pedal's path since the operator's foot is simply not at an angle with respect to the pedal which enables the generation of much power.

DISCLOSURE OF THE INVENTION

The present invention addresses the aforementioned problems by providing a method and apparatus for continuously transmitting linearly generated power to an axle and the like to rotatingly drive the axle. The invention theoretically maximizes the amount of power that can be generated by an individual with an arm or leg since power generation theoretically can be maximized if the arm or leg moves linearly, i.e. along a straight line during a stroke of the arm or leg for generating power. As such, the power transmitting or drive apparatus of the present invention is ideally suited for use with apparatus that are powered by an individual with his arms or legs. Some examples of suitable apparatus are bicycles and wheelchairs.

In its broadest sense, the power transmitting or drive apparatus of the present invention includes flexible ratch means such as flexible chain, belt or cable and cooperating first and second ratch engaging means for releasably engaging the flexible ratch means to continuously drive a sprocket/pulley-type member which, in turn, continuously drives, i.e. rotates an axle which is axially aligned and connected to the sprocket/pulley type member. The axle could be the axle of a wheelchair, bicycle wheel and the like which, when driven, would propel the wheelchair or bicycle.

In a preferred embodiment of the invention handle/pedal means, i.e. handles or pedals are also provided which are attached to the cooperating first and second ratch engaging means. This enables the apparatus to be powered by an individual with his arms or legs.

The method of the present invention provides continuous driving of an axle which may be the axle of a bicycle, wheelchair, or any other similar device. The method includes the steps of providing a drive apparatus as described above. The method further includes the step of moving the first and second ratch engaging members of the above-described apparatus in a direction parallel to the direction in which the flexible ratch is capable of moving so that the first ratch engaging member engages and drives the flexible ratch which rotates the sprocket/pulley-type member which, in turn, drives the axle. The method further includes a step of reversing the first and second ratch engaging members' direction of movement so that the first ratch engaging member releases the flexible ratch and the second ratch engaging member engages the flexible ratch. This releasing and engagement of the flexible ratch occurs simultaneously so that rotation of the sprocket/pulley-type member continues uninterrupted, thereby continuously driving the axle.

BRIEF DESCRIPTION OF DRAWINGS

The invention will be more readily understood by reference to the accompanying drawings wherein like reference numerals indicate like elements throughout the drawing figures, and in which:

FIG. 3 is an enlarged side elevational view of the chain engaging means of FIG. 2 which illustrates the chain engaging members' position when wheelchair occupant is making an upstroke with the wheelchair's forward handles.

FIG. 4 is an enlarged side elevation view similar to that illustrated in FIG. 3 showing, however, the chain engaging members in their neutral position where they are disengaged from the drive chain.

FIG. 5 is a side elevation view similar to FIG. 3 showing, however, the chain engaging members in the position they assume when the wheelchair occupant makes a downstroke with the wheelchair's forward handles.

DETAILED DESCRIPTION OF PREFERRED EMBODIMENTS

Figure 1:
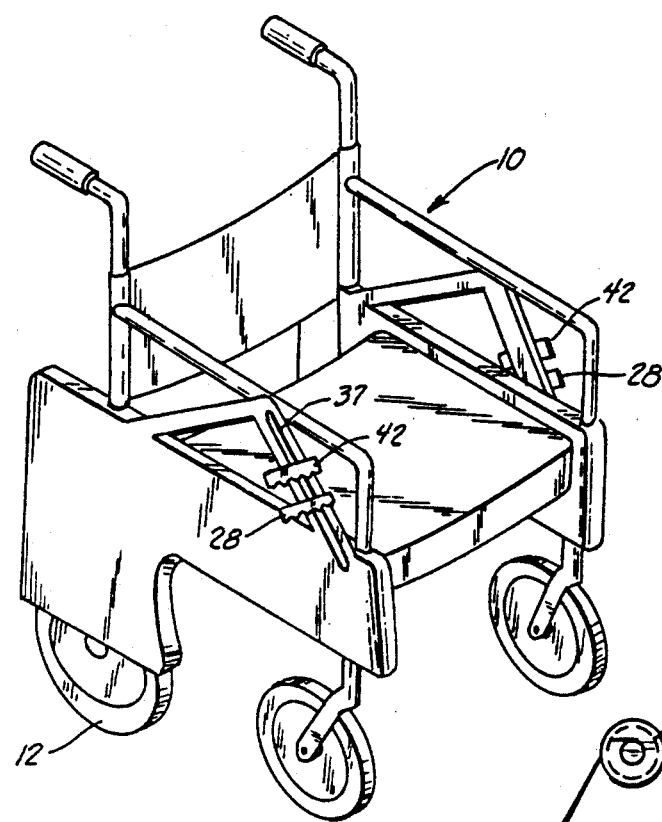
FIG. 1 is a perspective view of a wheelchair equipped with a drive apparatus of the present invention.

FIGS. 1 through 6 illustrate an apparatus of the present invention for driving a wheelchair 10 having a pair of propulsion wheels 12 which are attached to the frame of wheelchair 10. The apparatus includes a first drive sprocket 14 for driving the propulsion wheel which is attached to and axially aligned therewith by an axle 16. It will be appreciated that another drive apparatus (not illustrated) is located on the other side of the wheelchair which is identical to the illustrated drive apparatus.

The drive apparatus of the present invention also includes a second drive sprocket 18 and a first drive chain 20 which is slung about the pair of first and second drive sprockets 14, 18. The drive apparatus further includes a third drive sprocket 22 which is axially aligned and rigidly attached to second drive sprocket 18. A fourth drive sprocket 24 is also provided as well as a second drive chain 26 which is slung about the pair of third and fourth drives sprockets 22, 24.

The apparatus further includes a first handle 28 which is rigidly attached at point 30 to an endless cable 32 (slung about three pulleys 38, 39, and 40) which is in turn connected to a chain engaging means 34 at point 36. Chain engaging means 34 releasably engages chain 26 as a wheelchair occupant makes upward and downward strokes with handle 28 along a guide path 37 to continuously drive chain 26 in a clockwise direction (as viewed from FIG. 2) which, in turn, continuously drives chain 20 to propel the wheelchair in a forward direction. (i.e. when the wheelchair occupant makes similar upward and downward strokes with the handle 28 of the other drive apparatus located on the other side of the wheelchair). The details of chain engaging means 34 releasable engagement of chain 26 which drives the chain continuously in one direction is described in more detail below.

Figure 2:
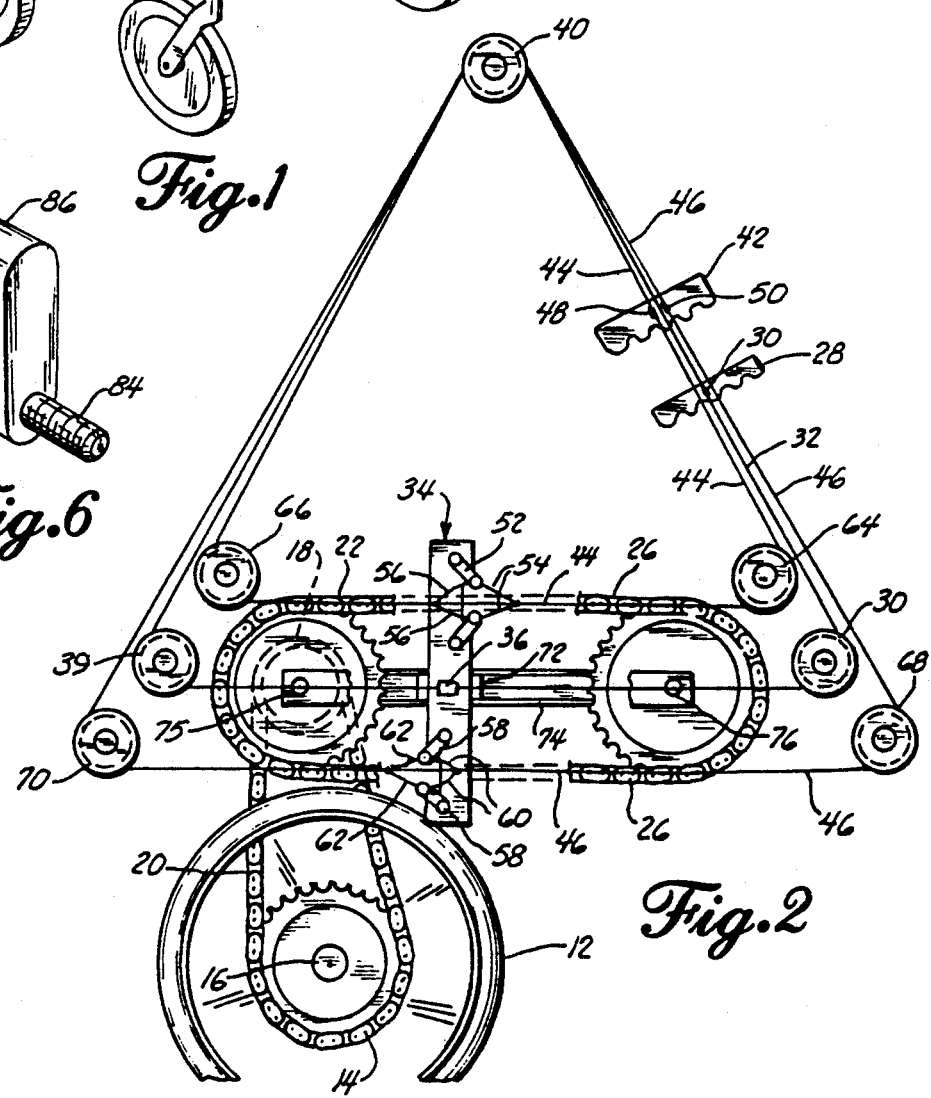
FIG. 2 is side elevation view of the drive apparatus for the wheelchair illustrated in FIG. 1.

FIG. 2 also illustrates that the drive apparatus of the present invention is provided with another handle 42 which is rigidly attached to a pair of endless cables 44 and 46 at points 48 and 50, respectively. Cable 44 is attached to a pair of first and second chain engaging members 52 via a right pair of cable segments 54 and a left pair of cable segments 56. Similarly, cable 46 is connected to another pair of chain engaging members 58 via a right pair of cable segments 60 and a left pair of cable segments 62. By attaching handle 42 to chain engaging means 34 in this fashion, chain 26 can be driven in the opposite direction which propels the wheelchair in reverse when the wheelchair occupant makes upward and downward strokes with handles 42. The details of how this is accomplished by the apparatus is described in detail below.

As with cable 32, cable 44 is also slung about three pulleys 64, 66 and previously mentioned pulley 40. Pulley 40 is provided with a separate groove (not shown) for guiding cable 44. Similarly, cable 46 is slung about three pulleys 68, 70 and pulley 40 which is provided with yet another groove (not shown) for guiding cable 46.

FIG. 2 also illustrates that the drive apparatus of the present invention includes a ball bearing track slider or sliding means 72 which is slidably received in a track 74. Track 74 is mounted about the axles 75,76 for sprockets 18 and 24. Track slider 72 is rigidly attached to the central area of the underside surface of chain engaging means 34. As such, it will be appreciated that chain engaging means 34 can only move in a linear direction back and forth between the axles of sprockets 18 and 24. This keeps chain engaging means 34 aligned with drive chain 26 which is slung about sprockets 18 and 24.

Figure 6:
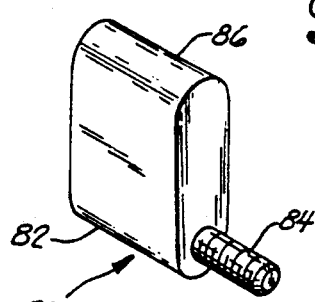
FIG. 6 is a perspective view of a chain engaging member illustrated in FIGS. 2 through 5.

FIG. 3 illustrates the details of chain engaging means 34 for driving chain 26. As illustrated, chain engaging means 34 has a base 80 upon which are mounted pivoting chain engaging members 52(a),(b) and 58(a), (b). FIG. 6 illustrates a perspective view of chain engaging member 52(a) which is identical to chain engaging members 52(b) and 58(a) and (b). As illustrated, each chain engaging member has an end 82 for housing a bolt 84 which extends therethrough and which is used to pivotally attach each chain engaging member to base 80. Each chain engaging member also has a free end 86 for swinging into engagement with the concave edges 88 of chain 26. It will be appreciated that when the free ends 86 of a chain engaging member are engaging a link of chain 26, chain 26 can be driven in either a forward or reversed direction. The direction of travel will depend upon which handle the wheelchair occupant is grasping to make downstrokes and upstrokes with. As previously mentioned, upstrokes and downstrokes made with handles 28 propel the wheelchair in a forward direction while such made with handles 42 propel the wheelchair in reverse.

FIG. 3 illustrates the position which chain engaging members 52 and 58 are in when the wheelchair occupant makes an upstroke along guide path 37. As can be visualized, when making an upstroke with handle 28, cable 32 attached to handle 28 pulls base 80 to the right. When this happens, the inertia of cables 44 and 46 (which are rigidly attached to the free ends 86 of the chain engaging members 52, 58 via cable segments 54, 56, 60 and 62) causes the free ends 86 of chain engaging members 52(a) and (b) to simultaneously engage a link of chain 26, i.e. engage the concave edges 88 of a chain link of chain 26. While this is happening, the inertia of cable 46 causes the free ends 86 of chain engaging members 58(a) and (b) to swing out of engagement with chain 26. Thus, it will be appreciated that with only the upper set of chain engaging members 52 (a) and (b) engaging chain 26, chain 26 is driven in a clockwise direction, which in turn propels the wheelchair forward (i.e., if a similar stroke is made with the other handle 28).

When the wheelchair occupant finishes making upstrokes with handles 28 and begins making downstrokes therewith, the chain engaging members pivot from their positions illustrated in FIG. 3 to their positions illustrated in FIG. 5. This pivoting occurs because base 80 is now moving to the left which causes the inertia of cable 44 to swing the free ends 86 of chain engaging members 52(a) and (b) out of engagement with chain 26. As this is happening, the inertia of cable 46 causes the free ends 86 of chain engaging members 58(a) and (b) to swing into engagement with chain 26. As such, those skilled in the art will appreciate that the movement or driving of chain 26 continues in the clockwise direction, thereby continuing the wheelchair's propulsion in the forward direction.

The path traveled by the inertial forces generated by cables 44 and 46 is somewhat difficult to explain, but is believed to be as follows. When making an upstroke with handle 28, the inertia of cable 44 is transmitted to free ends 86 of chain engaging members 58(a) and (b) via cable segments 56. Similarly, the inertia of cable 46 is transmitted to the free ends 86 of chain engaging members 58(a) and (b) via cable segments 62. When making a downstroke with handle 28, the inertial forces generated by cable 44 are transmitted to free ends 86 of chain engaging means 52(a) and (b) via cable segments 54. Similarly, the inertial forces generated by cable 46 are transmitted to the free ends 86 of chain engaging members 58(a) and (b) via cable segments 60.

It is also important that the cable segments of each pair have the same length. This insures that the chain engaging members to which the cable segments are attached pivot simultaneously to simultaneously engage the oppositely facing concave edges 88 of a single chain link. Such simultaneous engagement of a chain link by a pair of chain engaging members is necessary in accordance with the present invention for effective driving (and grabbing if you will) of the chain.

FIG. 4 illustrates chain engaging members 52(a) and (b) and 58(a) and (b) in a neutral position wherein neither set of chain engaging members 52, 58 is engaging chain 26. The chain engaging members pivot into this position when the wheelchair occupant lets go of handles 28, 42 (or at least stops making upstrokes with either pair of handles) and when the wheelchair moves forward, i.e., is either pushed or is coasting.

The chain engaging members pivot into neutral when the aforementioned happens because the inertia of chain 26 pushes the chain engaging members out of engagement with the chain. This is to be contrasted with the inertia of cables 44 and 46 which causes the free ends to move into engagement with chain 26 when downstrokes and upstrokes are made with handles 28 to propel the wheelchair forward.

The chain engaging members will remain in neutral (i.e., once put into neutral) until the wheelchair occupant begins making either an upstroke or downstroke with handles 28, 42. Once in neutral, the wheelchair can be pushed, or, if desired, it can coast in either a forward or a reverse direction.

If the wheelchair were to accidentally begin coasting in reverse, the wheelchair occupant can stop such movement by grabbing either pair of handles 28, 42 and beginning to make an upstroke or downstroke therewith, as previously mentioned. This will move the chain engaging members into engagement with the chain in one of the positions illustrated in either FIGS. 3 or 5 (the particular position depending on which pair of handles is grabbed and whether an upstroke or downstroke is made therewith) and the wheelchair will stop coasting in reverse when handles 28, 42 travel to the end of path 37. The wheelchair is prevented from coasting any further in reverse since the chain engaging members stay engaged with chain 26 once they pivot into engagement therewith, even if the wheelchair occupant lets go of the handles. Those skilled in the art will appreciate that the ability to prevent reverse coasting of the wheelchair is particularly desirable since it enables the wheelchair occupant to stop the wheelchair on the hill and perform any desired task with his hands which the occupant is free to use since they do not have to be used in any manner to prevent the wheelchair from coasting downhill i.e. they do not have to be used to grab handles 28,42 or to squeeze the wheelchair's handbrakes.

The chain engaging members can also be used to stop the wheelchair from coasting downhill in a forward direction. However, the process is somewhat different. Only the reverse pair of handles can be used and to prevent the wheelchair from beginning to coast forward again, the occupant must keep the chain engaging members engaged with the chain by holding onto the reverse handles and applying enough pushing or pulling pressure to keep the chain engaging members engaged with the chain. If the wheelchair occupant were to let go of the handles, the chain engaging members would simply pivot into neutral as previously described when the wheelchair begins to coast forward. It should also be mentioned that if the wheelchair is coasting downhill at a high rate of speed, the chain engaging members will not instantly engage the chain when handles 42 are grabbed and pulled or pushed. They will, however, impact up against the chain and generate resistance to the chain's continued movement. In time, the chain will slow down and ultimately stop. This method of braking the wheelchair is not the recommended method even though it works. The preferred braking method involves equipping the wheelchair with conventional hand brakes which, when squeezed, will brake the wheelchair in the conventional manner.

FIG. 3 also illustrates the position to which chain engaging members pivot when a wheelchair occupant makes a downstroke with reverse handle 42, which drives the wheelchair in reverse. It will be appreciated, however, that it is not the inertia of cables 44, 46 which swing the chain engaging members into and out of engagement with chain 26 when reverse handles 42 are used. Instead, it is the inertia of base 80. It will be recalled that reverse handle 42 is rigidly attached to both cables 44 and 46. Accordingly, when the wheelchair occupant makes a downstroke with handle 42, cables 44 and 46 are pulled to the left, as such is viewed from the perspective of FIGS. 2-5. Thus, it will be appreciated that it is the inertia of base 80 which acts on the free ends 86 of chain engaging members 52(a) and (b) to swing them into engagement with chain 26. Similarly, it is the inertia of base 80 which causes the free ends 86 of chain engaging members 58(a) and (b) to swing out of engagement with chain 26.

The path taken by the inertial forces in swinging the chain engaging members into and out of engagement with chain 26 is as follows. When making a downstroke with reverse handle 42, the inertial forces generated by base 80 are transmitted from base 80 through chain engaging members 58(a) and (b) through the free ends 86 thereof, and then through cable segments 62 to cable 46, thereby causing chain engaging members 58(a) and (b) to swing out of engagement with chain 26. Similarly, when making downstroke with reverse handle 42, the bases's inertial forces are transmitted from base 80 through chain engaging members 52, through their free ends 86, and then through cable segments 56 which direct the free ends into engagement with chain 26.

FIG. 5 illustrates the position to which chain engaging members 52 and 58 pivot when the wheelchair occupant begins making an upstroke with reverse handle 42. It will be appreciated that when making an upstroke with handle 42, cables 44 and 46 are pulled to the right. Thus, the inertia of base 80 pulls the free ends 86 of chain engaging members 52(a) and (b) out of engagement with chain 26. The path of inertia transmission is from base 80 through chain engaging members 52(a) and (b), through their free ends 86 and then through cable segments 54 to cable 44. Another way of perhaps explaining the movement of free ends 86 out of engagement with chain 26 would be to state that the inertia of base 80 tensions chain engaging members 52(a) and (b) and cable segments 54, thereby pulling the free ends of chain engaging members 52(a) and (b) out of engagement with chain 26.

With respect to chain engaging members 58(a) and (b) when making an upstroke with reverse handle 42, it will be appreciated that again, it is the inertia of base 80 which causes the free ends 86 of chain engaging members 58 (a) and (b) to move into engagement with chain 26. The inertial forces of base 80 travel through chain engaging members 58 (a) and (b), through free ends 86 thereof and then through cable segments 60 which direct free ends 86 into engagement with chain 26.

In view of the above, it will be appreciated that while the transmission of the inertial forces may be difficult to understand, the above described apparatus enables chain 26 to be continuously driven in a counterclockwise direction when viewed from the perspective of the drawings, which in turn enables the wheelchair to be propelled in reverse.

Figure 7:
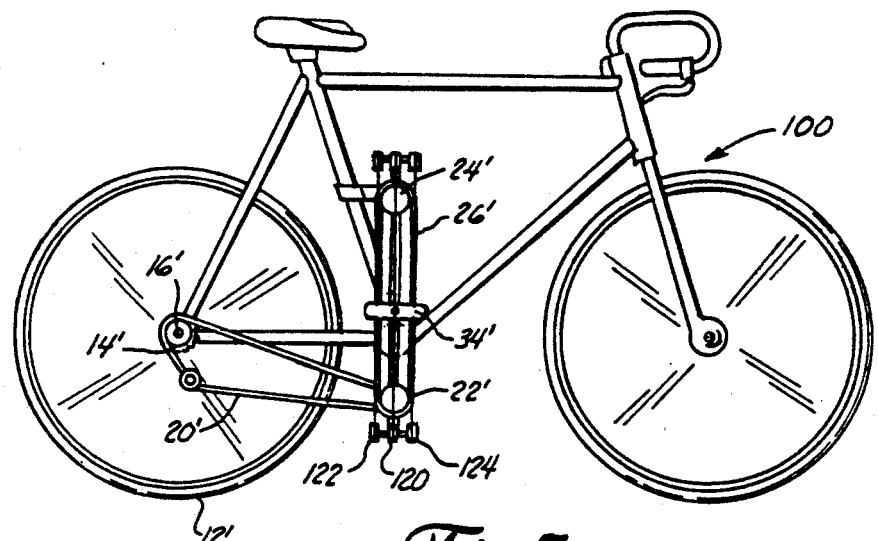
FIG. 7 is a side elevation view of a bicycle equipped with a drive apparatus of the present invention.
Figure 8:
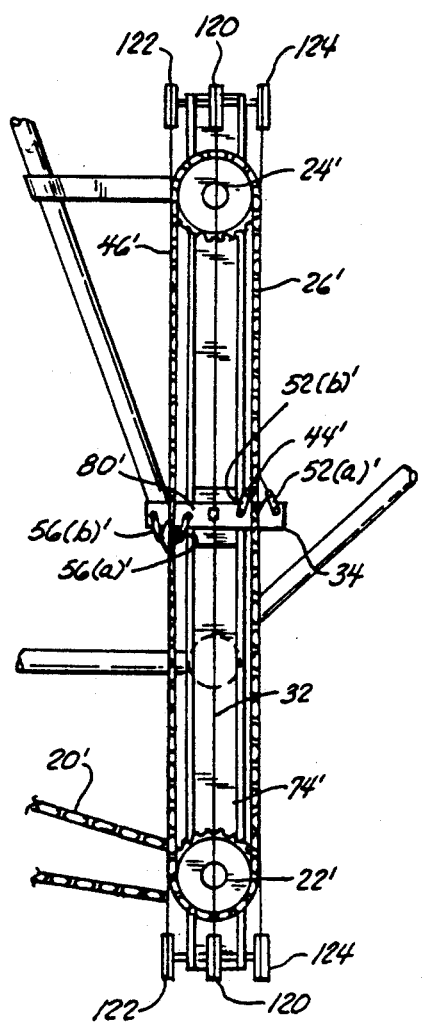
FIG. 8 is an enlarged side elevation view of the bicycle's drive apparatus FIG. 7.
Figure 9:
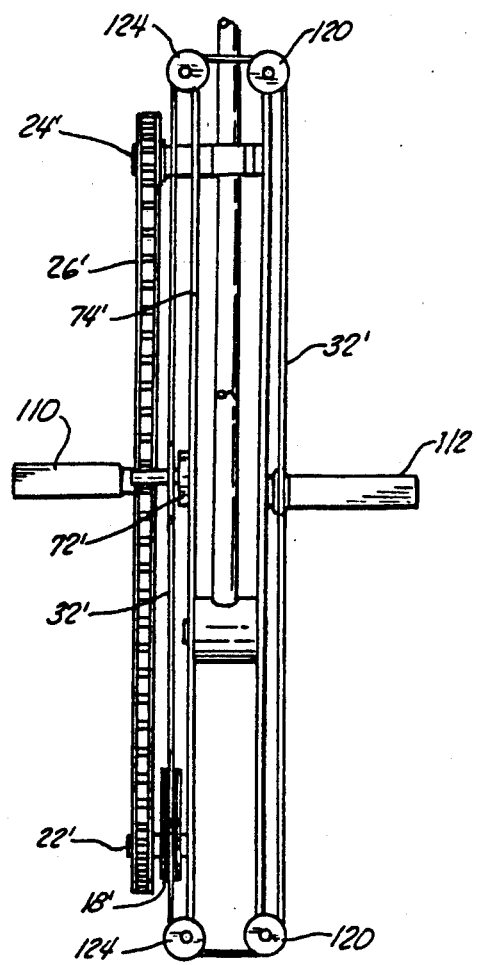
FIG. 9 is a front elevation view of the bicycle's drive apparatus taken along lines 9—9 of FIG. 7.

FIGS. 7 through 9 illustrates another drive apparatus of the present invention which is fundamentally the same as that illustrated for wheelchair 10. However, this drive apparatus has been adapted to drive the illustrated bicycle 100.

To make it easier for one to quickly understand the bicycle's drive apparatus, the components of the bicycle's drive apparatus which are functionally equivalent to those of the wheelchair's apparatus are numbered similarly with the exception that the numbers are primed.

The major difference between the drive apparatus of bicycle 100 and wheelchair 10 is that the bicycle's drive apparatus has no means for driving the bicycle in reverse. Reverse operation of bicycle 100 is, quite obviously, not necessary since bicycles are typically only driven in a forward direction. Accordingly, those having an understanding of the wheelchair's drive apparatus will appreciate that there are no handles or pedal means attached to cables 44' and 46' for driving bicycle 100 in the reverse direction. Nonetheless, cables 44' and 46' are very important elements of the bicycle's drive apparatus since they provide the inertia for swinging the chain engaging members into and out of engagement with drive chain 26', which occurs in a manner identical to that described for the wheelchair's drive apparatus as illustrated in FIGS. 3 through 5.

The other major difference between the drive apparatus for bicycle 100 and wheelchair 10 is that cable 32' has a pair of left and right pedals, 110 and 112, rigidly attached to it instead of the single handle 28 provided in the wheelchair's drive apparatus. Those skilled in the art will appreciate that the upstroke function provided by handle 28 in the wheelchair's drive apparatus is provided in the bicycle's drive apparatus by pedalling downwardly with pedal 112. Accordingly, it will be appreciated that chain 26' can be continuously driven by pedalling the bicycle in a conventional fashion. The only difference is that with the drive apparatus of the present invention, a bicyclist will be able to generate more power with greater efficiency since the strokes of each pedal follow a straight line i.e. a linear path. As previously alluded to, a linear stroke is advantageous since it enables the bicyclist to exert more force on a pedal during a pedaling stroke than is possible with the pedal of a conventional bicycle which travels through an arc-like path.

Other differences between the wheelchair's drive apparatus and the bicycle's drive apparatus include the following:

1. Cable 32' is slung about a set of four pulleys 120 instead of the three pulleys 38, 39 and 40 illustrated in FIG. 2. Those skilled in the art will appreciate that the set of four pulleys 120 could be replaced by a set containing only two pulleys. However, such a two pulley set would have to have larger diameter pulleys. Another difference between the drive apparatus of wheelchair 10 and bicycle 100 is that cables 44' and 46' are each slung about pulley sets having only two pulleys each, i.e. pulleys 122 and 124, as opposed to the three pulley sets illustrated in FIG. 2.

The invention has been described in detail with reference to particular embodiments thereof, but it will be understood that various other modifications can be effected within the spirit and scope of this invention.

What is claimed is:

1. An apparatus for use by a wheelchair occupant in manually propelling a wheelchair having a pair of propulsion wheels attached to the frame of the wheelchair comprising:
   a pair of first drive sprockets attached to and axially aligned with the propulsion wheels for driving the propulsion wheels;
   a pair of axially aligned second and third drive sprockets attached to the frame of the wheelchair;
   a pair of axially aligned fourth drive sprockets attached to the frame of the wheelchair;
   a pair of first and second drive chains, said pair of first drive chains being slung about said pair of first and second drive sprockets, said pair of second drive chains being slung about said pair of third and fourth drive sprockets;
   a pair of first handle means for gripping by a wheelchair occupant to enable the wheelchair occupant to make downward and upward strokes along a straight line; and
   a pair of chain engaging means connected to said pair of first handle means for releasably engaging said pair of second drive chains to continuously drive said second drive chains in one direction during the wheelchair occupant's downward and upward strokes with said pair of first handles which, in turn, continuously drive said first drive chains, thereby propelling the wheelchair.

2. Apparatus as claimed in claim 1 wherein each chain engaging means includes:
   first chain engaging means for engaging said second drive chain during the wheelchair occupant's upstroke and for releasing said second drive chain during the wheelchair occupant's downward stroke; and
   second chain engaging means for engaging said second drive chain during the wheelchair occupant's downward stroke and for releasing said second drive chain during the wheelchair occupant's upward stroke, said first and second chain engaging means cooperating so that one of said first and second chain engaging means engages said second drive chain as the other of said first and second chain engaging means releases said second drive chain.

3. An apparatus as claimed in claim 2 wherein each second drive chain has a plurality of connected chain links, each of which has opposing sides defining oppositely facing concave edges, and wherein each first and second chain engaging means includes simultaneous bearing means for simultaneously bearing against the oppositely facing concave edges of one chain link of said chain to engage and drive the chain.

4. An apparatus as claimed in claim 3 wherein both simultaneous bearing means of said first and second chain engaging means are mounted on a base and wherein each simultaneous bearing means includes a pair of first and second chain engaging members movably attached to said base for releasably engaging the oppositely facing concave edges of a chain link; and wherein said apparatus further comprises guide means for simultaneously directing said first and second chain engaging members into engagement with the oppositely facing concave edges of a chain link when said base is linearly moved along a line parallel to the direction in which said second drive chain is moved, said guide means also simultaneously directing said first and second chain engaging members out of engagement with the oppositely facing concave edges of a chain link when said base is linearly moved along said line in the opposite direction.

5. An apparatus as claimed in claim 4 wherein said guide means includes:

an endless pulley-mounted main cable;

a disengaging pair of first and second cable segments, each of which is connected at a first end thereof to a location on said main cable, said first cable segment being connected at its other end to first said chain engaging member, said second cable segment being connected at its other end to said second chain engaging member, said disengaging pair of cable segments directing said first and second cable engaging members out of engagement with said second chain when the inertia of said main cable causes said first and second chain engaging members to move out of engagement with said second chain; and an engaging pair of first and second cable segments, each of which is attached at one end thereof to a location on said main cable, said first engaging cable segment being connected at its other end to said first chain engaging member, said second engaging cable segment being connected at its other end to said second chain engaging member, said engaging cable segments directing said first and second chain engaging members into engagement with said second chain when the inertia of said main cable causes said first and second chain engaging members to move into engagement with said second chain.

6. An apparatus as claimed in claim 5 wherein said first handle means is attached to said base for driving said second drive chain in a forward direction.

7. An apparatus as claimed in claim 6 further comprising second handle means attached to said main cable for driving said second chain in a reverse direction wherein said disengaging pair of cable segments directs said first and second chain engaging members out of engagement with said second chain when the inertia of said base causes said first and second chain engaging members to move out of engagement with said second chain, and wherein said engaging pair of cable segments directs said first and second chain engaging members into engagement with said second chain when the inertia of said base causes said first and second chain engaging members to move into engagement with said second chain.

8. An apparatus as claimed in claim 5 wherein each of said engaging cable segments is of equal length so as to transmit inertial forces to and from said first and second chain engaging members simultaneously, and wherein each of said disengaging cable segments is of equal length so as to transmit inertial forces to and from said first and second chain engaging members simultaneously.

9. An apparatus as claimed in claim 1 further comprising track means extending between said third and fourth sprockets for slidably receiving said chain engaging means to maintain said chain engaging means in alignment with said second drive chain.

10. An apparatus as claimed in claim 9 wherein said track means includes ball bearing track sliding means slidably received in said track means for cooperating with said chain engaging means to maintain said chain engaging means in alignment with said second drive chain.

* * * * *